Oct. 11, 1960 J. A. HERBST 2,956,214

DIODE

Filed Nov. 30, 1955

*INVENTOR.*
JOHN A. HERBST
*BY* Philip G. Hilbert
ATTORNEY

United States Patent Office 2,956,214

Patented Oct. 11, 1960

2,956,214

DIODE

John A. Herbst, Montville, N.J., assignor to Bogue Electric Manufacturing Co., Paterson, N.J., a corporation of New Jersey Filed Nov. 30, 1955, Ser. No. 550,056

4 Claims. (Cl. 317—234)

This invention relates to diodes, and more particularly concerns diodes of the semi-conductor type used as rectifiers or the like.

In conventional rectifier diodes having a semi-conductive element of silicon or other suitable material as the active element thereof, heat dissipation becomes a problem when the diode is designed to carry heavy loads. The efficiency of the device, in part, depends on optimum operating temperatures, and means must be provided for dissipating excess heat during the operation thereof, to maintain such operating temperatures.

Accordingly, an object of this invention is to provide an improved diode of the character described, which includes means for effecting rapid heat dissipation directly from the semi-conductive element thereof.

Another object of this invention is to provide an improved diode of the character described, which includes flat terminal members and means for directly transmitting heat from the semi-conductive element to one of the terminal members.

A further object of this invention is to provide an improved diode of the character described, wherein the semi-conductive element is hermetically sealed between a pair of terminal plates, together with means for insuring maximum surface contact between the element and one terminal plate to provide for maximum heat transfer therebetween.

Other objects of this invention will in part be obvious and in part hereinafter pointed out.

Figure 1:
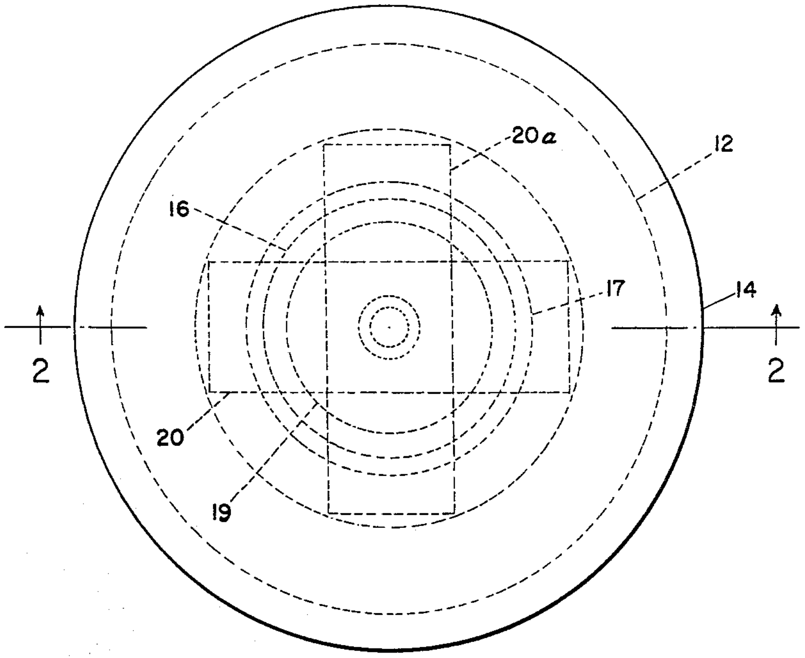
Figure 2:
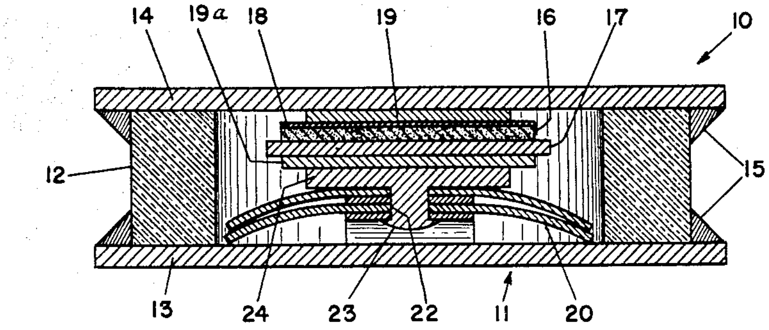

In the drawing, Fig. 1 is a top view of a diode assembly embodying the invention; and Fig. 2 is a transverse sectional view taken on the line 2—2 of Fig. 1.

Referring in detail to the drawing, 10 designates a diode embodying the invention. The same comprises a cylindrical casing 11 for hermetically sealing therein the semi-conductive element thereof. The casing 11 comprises a ring shaped member 12 of porcelain or other ceramic insulating material, the open ends of said member being closed by terminal members 13, 14 in the form of metal discs which are sealed in place by means of annular strips of solder 15.

The semi-conductive element within casing 11 comprises a flat layer 16 of silicon or other suitable material, mounted on one surface of a metal supporting disc 17. Such disc 17 may be formed of a cobalt-nickel-iron alloy, known as Kovar, or other alloys, which have an expansion coefficient substantially equal to that of the supported layer of silicon. The outer surface of the silicon layer 16 is provided with a barrier film 18 of aluminum, boron or other suitable material, in a manner known in the art.

A flat disc 19 of a soft metal, such as a lead alloy or the like, is positioned between barrier film 18 and the inner surface of terminal disc 14 and in intimate contact therewith.

Means is provided for pressing the silicon layer 16 and the barrier film 18 towards the terminal disc 14 in order to insure the intimate surface contact between film 18 and disc 14 through the soft metal disc 19 which will accommodate itself to any surface irregularities in the film and terminal disc, thereby providing for maximum heat transmission from the silicon layer 16 to the disc 14 over extensive surface areas thereof.

Accordingly, a set of metal spring members 20 in bowed form are arranged at right angles to a second set of similar spring members 20*a* and interleaved therewith, within casing 11, the opposite ends of said spring members bearing on the inner surface of terminal disc 13 and extending to circumferential portions of the inner surface of member 12.

The intersecting mid-portions of spring members 20, 20*a* are formed with registering openings 22 for receiving therein the shank 23 of a flat metal button 24. The outer surface of button 24 bears against the supporting disc 17 with an interposed flat, soft metal disc 19*a*, similar to disc 19, therebetween.

It will be apparent, that the spring members 20, 20*a* will resiliently urge the barrier film 18 into intimate contact with disc 19, which in turn bears against terminal disc 14, thereby insuring a broad contact area for maximum heat transmission from the silicon layer 16 to disc 14 to afford excellent heat dissipating means, as well as providing electrical contact means. The other terminal disc 13 is electrically connected to the other surface of silicon layer 16 through springs 20, 20*a*, button 24, soft metal disc 19*a* and supporting disc 17.

The several parts of the diode 10 may be readily and quickly assembled by first securing one of the terminal discs 13 or 14 to the ring 12 by solder 15, inserting the remaining elements in proper relation to each other, within the casing and pressing the remaining terminal disc into place against the bias of spring members 20, 20*a* and sealing the same in place by solder 15.

The completed diode 10 is now ready for use, as by placing the same in a suitable holder, not shown, together with cooling fins or the like, not shown, in contact with the terminal discs of the diode. Terminal connectors, not shown, may also be placed in contact with the terminal discs of the diode.

It is understood that materials other than silicon may be used for the semi-conductive element and various metals or alloys which are relatively soft and of good thermal conductivity may be used as discs 19, 19*a*.

It will thus be seen that there has been provided an improved diode of the semi-conductor, rectifier type, in which the several objects of the invention are achieved, and which is well adapted to meet the conditions of practical use.

As various changes may be made in the embodiment of the invention shown herein without departing from the spirit of the invention, it is understood that all matter herein shown or described shall be deemed illustrative and not by way of limitation, except as set forth in the appended claims.

Having thus disclosed my invention, I claim as new and desire to protect by Letters Patent:

1. A diode comprising a metal supporting disc, a layer of semi-conductive silicon material on said disc, a barrier film on the exposed surface of said semi-conductive layer, a flat heat dissipating metal terminal member adjacent said film, a metal terminal member adjacent said supporting disc, a soft metal layer between said film and said first terminal member, and metal spring means between said supporting disc and said second terminal member for resiliently biasing the silicon layer toward said first terminal member whereby to maintain maximum surface contact between the surfaces of the soft metal layer and the surfaces in contact therewith.

2. A rectifier diode comprising a ring shaped insulating casing member, flat terminal members closing opposite sides of said casing member, a layer of semi-conductive material having a barrier film on one surface thereof within said casing with said film opposite one terminal member, a soft metal layer in contact with said film and the inner surface of said one terminal member, and bowed metal spring means within said casing with the opposite ends thereof in contact with the other of said terminal members, the intermediate portion of said spring means biasing said semi-conductive layer toward said first terminal member to provide intimate surface contact between the opposite surfaces of said soft metal layer and the surfaces in contact therewith.

3. A diode comprising a pair of flat terminal members, means for holding said terminal members in fixed relation to each other, a flat semi-conductive element having a barrier film on one side thereof, said element being disposed between said terminal members, a soft metal layer disposed with one surface thereof in contact with the inner surface of one terminal member and the other surface thereof in contact with said barrier film, and electrically conducting resilient means between the other terminal member and said element for pressing said soft metal layer into intimate contact with said barrier film and said one terminal member throughout their opposed contacting surfaces, said one terminal member having its outer surface exposed to radiate heat transmitted thereto from said element.

4. A diode as in claim 3 wherein said one terminal member has a surface area greater than the surface area of said semi-conductive element.

References Cited in the file of this patent

UNITED STATES PATENTS

| | | |
|---|---|---|
| 1,715,691 | Ackerly | June 4, 1929 |
| 1,956,675 | Geiger | May 1, 1934 |
| 2,172,887 | Hartley et al. | Sept. 12, 1939 |
| 2,662,997 | Christensen | Dec. 15, 1953 |
| 2,712,619 | Zetwo | July 5, 1955 |
| 2,758,262 | Geisselsoder | Aug. 7, 1956 |
| 2,799,815 | Lockett | July 16, 1957 |
| 2,802,158 | Walter et al. | Aug. 6, 1957 |
| 2,821,691 | Andre et al. | Jan. 28, 1958 |